United States Patent
Ollikainen

(10) Patent No.: US 10,223,093 B2
(45) Date of Patent: Mar. 5, 2019

(54) METHOD AND SYSTEM FOR CONTEXT-BASED CONTROL OVER ACCESS TO PERSONAL DATA

(71) Applicant: PCMS Holdings, Inc., Wilmington, DE (US)

(72) Inventor: Ville J. Ollikainen, Vihti (FI)

(73) Assignee: PCMS Holdings, Inc., Wilmington, DE (US)

( * ) Notice: Subject to any disclaimer, the term of this patent is extended or adjusted under 35 U.S.C. 154(b) by 268 days.

(21) Appl. No.: 14/959,421

(22) Filed: Dec. 4, 2015

(65) Prior Publication Data

US 2016/0170730 A1     Jun. 16, 2016

Related U.S. Application Data

(60) Provisional application No. 62/091,323, filed on Dec. 12, 2014.

(51) Int. Cl.
G06F 8/61     (2018.01)
G06F 21/62    (2013.01)

(52) U.S. Cl.
CPC ............ *G06F 8/61* (2013.01); *G06F 21/6245* (2013.01)

(58) Field of Classification Search
None
See application file for complete search history.

(56) References Cited

U.S. PATENT DOCUMENTS

| | | |
|---|---|---|
| 6,748,195 B1 | 6/2004 | Phillips |
| 7,093,122 B1 | 8/2006 | Susser |
| 8,621,645 B1 | 12/2013 | Spackman |
| 9,141,373 B2 * | 9/2015 | Capper .............. G06F 8/65 |
| 2003/0182394 A1 | 9/2003 | Ryngler |
| 2004/0093155 A1 | 5/2004 | Simonds |
| 2006/0010240 A1 | 1/2006 | Chuah |

(Continued)

FOREIGN PATENT DOCUMENTS

| | | |
|---|---|---|
| EP | 2302866 | 3/2011 |
| EP | 2302886 A1 | 3/2011 |

(Continued)

OTHER PUBLICATIONS

Zhang, "Efficient, Context-Aware Privacy Leakage Confinement for Android Applications without Firmware Modding", 2014, ACM 978-1-4503-2800-5/14/06.*

(Continued)

*Primary Examiner* — Hossain M Morshed

(74) *Attorney, Agent, or Firm* — Invention Mine LLC

(57) ABSTRACT

Systems and methods are described for providing user control over access to private data. An exemplary embodiment is performed on a client computing device in which separate computing environments referred to as context modules are installed. Each context module has a context identifier. An application is installed in a context module. The client computing device receives a request for data from the application, where the request for data includes a schema identifier that identifies the data. If the schema identifier is associated with the context identifier in a rules data storage, then the data is provided to the application. Otherwise, a user is prompted as to whether to permit the data request.

15 Claims, 8 Drawing Sheets

(56) References Cited

U.S. PATENT DOCUMENTS

| | | | | |
|---|---|---|---|---|
| 2006/0090202 A1* | 4/2006 | Liu | ...................... | H04L 63/101 726/17 |
| 2007/0011158 A1 | 1/2007 | Parikh | | |
| 2007/0143823 A1* | 6/2007 | Olsen | .................. | G06F 21/6218 726/1 |
| 2009/0019424 A1* | 1/2009 | Klein | ...................... | G06F 9/468 717/116 |
| 2009/0055377 A1 | 2/2009 | Hedge | | |
| 2009/0115600 A1 | 5/2009 | Lee | | |
| 2010/0222080 A1 | 9/2010 | Carreras | | |
| 2011/0225426 A1 | 9/2011 | Agarwal | | |
| 2011/0271201 A1* | 11/2011 | Cavagnari | .............. | G06Q 10/10 715/751 |
| 2012/0108172 A1 | 5/2012 | Bullen | | |
| 2012/0115438 A1 | 5/2012 | Umealu | | |
| 2012/0203491 A1 | 8/2012 | Sun | | |
| 2013/0232552 A1* | 9/2013 | Brush | .................. | G06F 21/6263 726/4 |
| 2014/0108371 A1* | 4/2014 | Swerdlow | ............. | G06F 3/0482 707/706 |
| 2014/0141714 A1 | 5/2014 | Ghosh | | |
| 2014/0143326 A1* | 5/2014 | Rajaram | ................ | G06Q 30/02 709/204 |
| 2014/0171064 A1 | 6/2014 | Das | | |
| 2014/0201760 A1* | 7/2014 | Kraljic | .................... | G06F 9/543 718/108 |
| 2014/0206391 A1 | 7/2014 | Perotti | | |
| 2014/0244710 A1 | 8/2014 | Sharma | | |
| 2014/0279007 A1 | 9/2014 | Srinivasan | | |
| 2014/0337466 A1* | 11/2014 | Li | ...................... | H04L 63/0407 709/217 |
| 2015/0065170 A1* | 3/2015 | Brisebois | ................ | H04W 4/04 455/456.3 |
| 2015/0100890 A1* | 4/2015 | Kosmiskas | ........... | G06F 3/0484 715/744 |

FOREIGN PATENT DOCUMENTS

| | | | | |
|---|---|---|---|---|
| WO | | 2009046389 | | 4/2009 |
| WO | WO | 2009046389 A1 | * 4/2009 | ......... G06F 21/6245 |
| WO | | 2009057914 | | 5/2009 |
| WO | | 2013169974 | | 11/2013 |
| WO | | 2015030783 | | 3/2015 |

OTHER PUBLICATIONS

Singh, "Practical Context-Aware Permission Control for Hybrid Mobile Applications", 2013, Springer-Verlag Berlin Heidelberg 2013.*

Zhang M., et. al, "Efficient, Context-Aware Privacy Leakage Confinement for Android Applications without Firmware Modding", pp. 259-270.

"Content Provider Basics", Android Developers available at http://developer.android.com/guide/topics/providers/content-provider-basics.html.

Jeff Benjamin, "How to toggle Airplane mode on Apple watch", May 1, 2015. Available at http://www.idownloadblog.com/2015/05/01/how-to-toggle-airplane-mode-on-apple-watch/.

iClarified, "How to Enable Airplane Mode on the Apple Watch and iPhone at the Same Time". Available at: https://www.youtube.com/watch?v=XNSHTq6z8ag. Published on May 13, 2015.

"PDroid Privacy Protection", Android Apps on Google Play. Available at: https://play.google.com/store/apps/details?id=com.privacy.pdroid.

Matthew Rogers, "LBE Privacy Guard Monitors and Controls What Permissions Your Android Apps Have", filed to App of the Day. Available at: http://lifehacker.com/5807797/lbe-privacy"-guard-monitors-and-controls-what-permissions-your-android-apps-have.

"Security Tips", Android Developers. Available at: http://developer.android.com/training/articles/security-tips.html.

"Android app manifest <permission>". Available at: http://developer.android.com/guide/topics/manifest/permission-element.html#plevel.

"Contacts Provider", Android Developers. Available at: http://developer.android.com/guide/topics/providers/contacts-provider.html.

Singh, Kapil, "Practical Context-Aware Permission Control for Hybrid Mobile Applications", IBM T.J. Watson Research Center, 20 pages.

Notification of Transmittal of the International Search Report and The Written Opinion of the International Searching Authority, or the Declaration, for PCT/US2016/047437, dated Oct. 11, 2016, 10 pages.

Notification of Transmittal of the International Preliminary Report on Patentability for PCT/US2016/052898 dated Oct. 31, 2017.

International Report on Patentability for PCT/US2016/047437 completed on Dec. 15, 2017.

Written Opinion of the International Preliminary Examining Authority for PCT/US2016/052898 dated Aug. 10, 2017.

Notification of Transmittal of the International Search Report and The Written Opinion of the International Searching Authority, or the Declaration, for PCT/US2016/032453 dated Nov. 17, 2016, 13 pages.

Notification of Transmittal of the International Search Report and the Written Opinion of the International Searching Authority, or the Declaration for PCT/US2016/052898, dated Nov. 16, 2016, 11 pages.

Notification of Transmittal of the International Preliminary Report on Patentability for PCT/US2016/032453 dated Jul. 18, 2017, 17 pages.

* cited by examiner

METHOD AND SYSTEM FOR CONTEXT-BASED CONTROL OVER ACCESS TO PERSONAL DATA

CROSS-REFERENCE TO RELATED APPLICATION

The present application is a non-provisional filing of, and claims benefit under 35 U.S.C. § 119(e) from, U.S. Provisional Patent Application Ser. No. 62/091,323 filed Dec. 12, 2014, the entire disclosure of which is incorporated herein by reference.

BACKGROUND

The business environment in marketing is rapidly changing. Legacy one-to-many marketing such as broadcast and newspaper advertisements and outdoor signage are losing ground to more targeted advertising, less granular segmentation, and even personalized messages. In order to be effective, personalization requires personal information from the users, in one form or another.

Personal information is typically related to a specific context a user is in. For example, if a person is interested in gardening, there might be personal information which contains a list of tools and plants owned or used by the individual, a diary how the individual's plants grow, what insects have been detected and so forth. This information can be stored, and the user may be likely to share the information with other people, especially people who are also interested in gardening. On the other hand, the same person may also have a strong interest in other areas, such as online gaming. Personal information related to this interest may also be stored, such as a logbook on bets, wins and losses, as well as credentials for different betting and gambling sites. Whereas a user may be willing to share the information related to gardening, the user is much less likely to want to share information related to gambling. Such information should be available only to gambling related contexts and, within that context, only to sites that really need it and that can process the information confidentially.

While different types of information naturally have different levels of sensitivity, it is also the case that the same information can have different levels of sensitivity in different contexts. For instance, disclosing the home address may be not sensitive in a context of participating a residential association, but more sensitive in a context of travelling.

SUMMARY

Systems and methods are described for context-sensitive control over the distribution of personal information. The information is stored in data storage of a client computing device. The information is arranged as data elements, each of which is associated with at least one descriptive keyword and a unique identifier. A user can be associated with a plurality of contexts and computing environments that are able to seek access to the data elements. The computing environments are identified by respective context identifiers. A filtering layer module can act as a local firewall to prevent unauthorized access by applications within the computing environments to the data elements. The filtering layer module allows access by a computing environment to a data element only if the context identifier of the computing environment is associated with a schema identifier of the data element in a rules data storage.

In some embodiments, the association between identifiers and keywords is available to a plurality of users from a common repository. Similarly, the definition of at least one of said computing environments is available to a plurality of users from a common repository. The definition may include a list of identifiers that the computing environment is allowed to access.

In some embodiments, the first time a user uses a particular computing environment, he or she is prompted as to whether to permit the computing environment access to the identified data element. The decision of the user is stored in rules data storage, and subsequent decisions as to whether to permit access to the data are made automatically by reference to the rules data storage.

DETAILED DESCRIPTION

Figure 1:
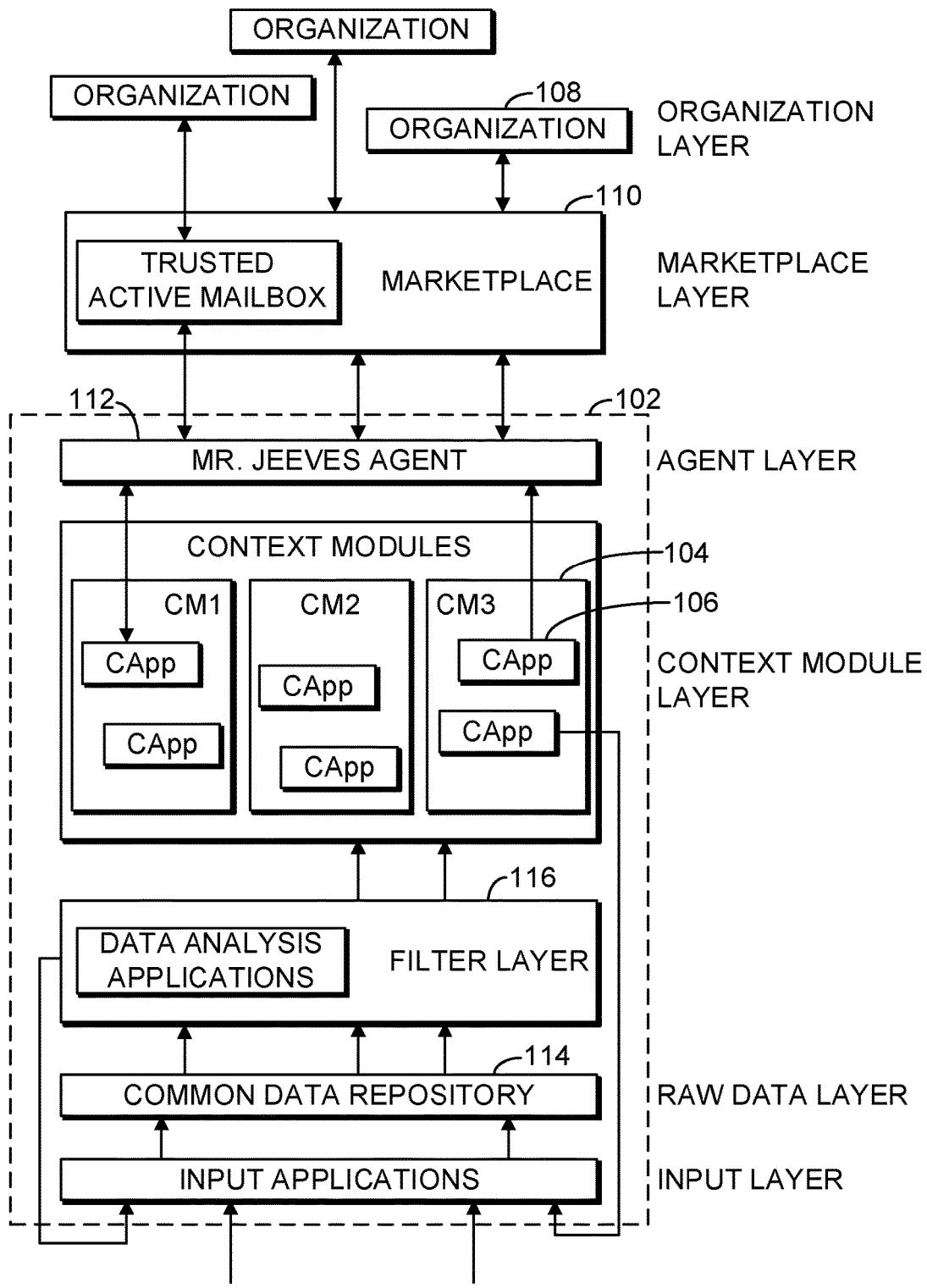
FIG. 1 is a schematic block diagram illustrating functional architecture of a context-centric infrastructure employed in some embodiments.

A computing device can provide support for different contexts by providing different user interfaces for different contexts and by providing personal data protection by context. To explain the concept of a context with sensitive data, consider an exemplary user who is a casual gambler. The user is not interested in sharing this hobby with anyone else, except perhaps other gamblers. He is also an active social media user, he likes to watch movies, he goes to work every day, and he keeps every now and then electronic record of his health. In this example there are already five different contexts: work (e.g. named "MyWork"), movies ("MyMovies"), social networking ("MyFriends"), gambling ("MyPoker") and health ("MyHealth"). In a context-enabled computing device, personal data belonging to different contexts is protected differently, according to context settings.

Technologies are available that protect mobile devices from unauthorized use, amounting to switching from no context to some personal context. For instance, PIN codes, passwords and gestures, as well biometric authentication, such as fingerprint scanning or walking style, are used to allow access to mobile device use. While the access to the mobile device has been granted, typically all data is available for the user without restrictions. As a consequence, security measures for personal data protection must be built into individual services.

Personal computing devices, such as smart phones, tablets and even smart watches have different views into which organize different applications. These applications, however, access the data in the device (or cloud) uniformly, not depending on the context the user is in. Thus it becomes possible for a user to unintentionally disclose sensitive data actually belonging to context A (say, health) when launching an application when in context B (say, a social network service upload), not to mention malware, which may deliberately breach personal information.

Some launcher applications, such as Aviate by Yahoo, organize applications according to contexts, but do not address data protection.

In another solution for a context related user interface (UI), Google Now cards, the service provider Google collects all the personal data and tracks the use of the cards. Thus, this solution does not address context specific personal data protection at all. From a UI perspective, there is also lack of transparency, such that users may be unaware why any particular card is presented to the user.

HomeKit and HealthKit technology from Apple operate to protect home and health related data, but they do not provide support for user contexts as a whole.

In personal computing, users can organize applications, bookmarks and shortcuts into different folders. Data in different folders may have different security measures. However, applications have access according to user account preferences, not according to folders.

In the "BYOD" (Bring Your Own Device) paradigm, people have their own devices, while data is owned by a third party (e.g. employer). There may be multiple user accounts in a device, one for work, and other for private use. This concept also lacks more general concept of contexts by having data within each application (for instance calendar) divided into different contexts (work, team, private, family).

Desktop/laptop operating systems, as well as Android versions from 4.2 on have multiple user logins, with different users having different data storage areas and different access profiles. It could be claimed that a user may configure several accounts for different contexts, the accounts then representing contexts. Fast user switching may make it quite convenient. However, in this case, different user accounts are separate, i.e. neither do they not have common user names, addresses, credentials etc., nor do they provide any easy means for context change, related to the ease of launchers.

In exemplary embodiments disclosed herein, any device may have a plurality of user accounts, and each user account may support a plurality of contexts.

Systems and methods disclosed herein provide techniques for protecting personal data related to specific contexts in such a way that data-sharing visibility preferences, once set for one application related to a context, are be applied to all applications in the same context.

In exemplary embodiments, data visibility rules are defined for each context, and users can define as many contexts they wish. These rules are hereinafter referred as "context-based rules". Furthermore, different devices associated with a user are able to use the same context-based rules, context definitions, and the same data. For instance if there is a "MyMovies" context in a smart watch containing history of movies seen and personal ratings for each movie, then a personal tablet of the user also has the "MyMovies" context and has access to the same data.

Data sharing is based on contexts as well. Once it is defined which data is visible to a context, such as "MyMovies", the user may provide an indication that a third party service, such as IMDb (Internet Movie Database), is trusted in the particular context and can access data there, such as the history of movies seen and personal ratings given to those movies. Trusting one third party service in the context does not mean that the third party service would be trusted in other contexts. For example, IMDb may not be trusted for accessing any health records, or the real user name or address, whereas a third party such as University Hospital may be trusted to see the data visible to "MyHealth" context, but not the "MyMovies" context.

In exemplary embodiments, contexts appear to the user as different views on a user interface or as different lists of applications.

Exemplary embodiments of the present disclosure are implemented in a system organized using the functional architecture illustrated in FIG. 1. As illustrated in FIG. 1, a client computing device 102, such as a WTRU (described below) includes a plurality of context modules 104 (CM1, CM2, CM3), each of which includes one or more context applications 106 (CApps). The context applications in the context modules communicate with outside entities (e.g., a marketplace infrastructure 110 and other organizations 108) through an agent layer module 112 that operates to manage and negotiate client privacy and information sharing. The client computing device locally stores data in a common data repository 114. Context modules and the applications therein are capable of accessing the data in the common repository through a filter layer module 116. The filter layer module operates to protect user privacy by limiting the type of information available to each of the context modules, and thus to each of the applications within the context modules.

Context modules encapsulate context-specific personal data. Personal data is available to context applications ("CApps"), and to organizations through context modules. Context refers to different user activities, which are commonly related to personal interests or duties. A context module provides access to data relevant to a specific context or topic (e.g. travel, house). Context modules can in some embodiments appear to users as user interface means to organize context related applications, in which case a context is selected when launching an application organized to the context. The data may originate from automatic and manual sources, and is filtered out of the common repository to contain only data that relates to each specific context or topic. Examples of general context modules are Real Time Context, Finance, Travelling, Home, Fitness, Entertainment, Transportation, Food, Shopping, Ownerships, Hobbies, Work. There can be also more focused (narrower) context modules, for example there could be a subset of Entertainment for movies, or subset of Shopping for clothes-related data. Information may also include basic descriptive data, such as contact data, household members, demographics, relationships. This information can be used to provide a connection to different context modules and context applications. Context modules can preferably combine different kind of data. New context modules can be created based on demand.

Various techniques can be employed to implement context modules. For example, different context modules can be implemented as different computing environments such as sandboxes, different physical platforms, different virtual platforms (e.g. Java Virtual Machines), virtual devices such as an Android emulator, or other software implementations with limited access to outside resources, such as operating system features, databases, or even applications like launchers. Each context identifier is associated with a computing environment such as a physical platform, a virtual platform like Java, an interpreter, a virtual device like an Android emulator, other software with limited access to outside resources, or other computing environment providing data security.

Each context module is associated with a context identifier (Context_ID). A publicly-available resource may be provided that describes, for each context identifier, the associated context.

In some embodiments, a context application is closely related to the context of a context module. In other embodiments, generic context applications can be provided to allow visualization of the personal data of a user and to enable a user to modify and update his or her personal data. In some embodiments, a context application offers a service that combines different functionalities within a single context application. Specific context applications can be used for data mining in context modules. In some embodiments, context applications have a user interface. In other embodiments, a context application can be used that does not have any user interface.

In some exemplary methods, each piece of data stored in the common repository has a global description, referred to herein as a data schema. Each data schema is associated with a unique schema identifier (Schema_ID), which may be represented by a keyword, such as "family_name", "fertilizer" or "lottery_site". Data schemas may be organized into a hierarchical structure, e.g. using ontologies having upper level descriptions. Schemas make it possible to utilize any piece of data globally, between different layers and different applications in each layer. All schemas may be associated with a human-readable description identifying what the information in the schema exactly means.

In some embodiments, different outside organizations and entities which might be the target of user data transaction and with which a user computing device may communicate are assigned an entity identifier (Entity_ID). The assignment of entity identifiers may be consistent across user computing devices. For example, entity identifiers may be linked to a uniform resource identifier (URI) associated with an entity or may be linked to certificate information issued by a certifying authority.

Personal data is stored in the common repository as elements, each element being associated with a data schema identifier Schema_ID. Any application or service attempting to access a particular personal data element may request the piece of data by referring to the identifier Schema_ID.

Global definitions may be provided for schemas and IDs. These global definitions may be provided in a database or other lookup service capable of providing information for any given ID. The information available through the lookup service may include information relating to Schema_IDs and Context_IDs. In addition, each context module and each context application may be provided its own ID in the same lookup service. The IDs are preferably unique values in a 64 bit or 128 bit number space, such as Universally Unique Identifiers (UUID, advantageously v5). These values may be calculated from globally available property descriptions, such as JSON-LD identifiers.

Exemplary embodiments disclosed herein make use of the filter layer module as an interface between the raw data layer module and the context module layer to ensure that a context application is able to access only the data that pertains to the context module from which the context application was launched. The client device has an access to a rules data storage that stores associations between context identifiers and schema identifiers. The rules data storage may be implemented using a database or other data structure on a storage medium of the client computing device.

In an exemplary embodiment, a user might have a context module associated with the context "Gardening" and a context module associated with the context "Gambling" on the user's client computing device. In the rules data storage, each of these modules is associated with one or more data schema identifiers Schema_ID of data elements that can be accessed from within the respective context module. The association between context identifiers and schema identifiers may be referred to as local firewall rules. The collection of associations between schema identifiers and context identifiers may be referred as a firewall arrangement. For instance, the firewall arrangement may allow "Gardening" to access data elements that have respective schema identifiers associated with "family_name" and "fertilizer", whereas "Gambling" is allowed to access "family_name" and "lottery_site". In this way, a firewall arrangement can be used as a measure to protect privacy.

The user can install one or more context applications to each context module. These context applications may utilize the common repository information that the context module is permitted to access. The context applications in the context modules may in turn process the available information and distribute either the raw data or the results to upper layers, possibly to third parties (referred to as "organizations" in FIG. 1), depending on the context application.

Context applications may be available for download from a marketplace. The marketplace or other information source may operate to provide users with information as to which Schema_IDs are relevant (e.g. recommended or required) for use with each context application. Advantageously, each context application has a publicly-available schema which contains a list of Schema_IDs for data used by the application. If the context application processes raw data and produces certain results, the format of the results may also have Schema_IDs.

As an additional measure for protecting user privacy, a user should install only those context applications to each context module that follow his privacy preferences. Similarly, the user should install only context modules that follow the user's privacy preferences. In some embodiments, installing a context application to a context module leads an icon representing that application to be organized into a user interface view or container corresponding to that context.

Different strategies can be implemented for generating associations between schema identifiers and context identifiers (firewall rules). Such strategies can be used independently or in combination. In some embodiments, the associations between schema identifiers and context identifiers can be loaded into the rules data storage as a set of predefined rules. For example, when the user installs a context module, the module itself may contain some Schema_IDs that the relevant context applications are likely to use. The Context_ID advantageously has a publicly available schema which contains a list of default Schema_IDs that are likely to be used (or required) by context applications within a context module and thus are relevant to the associated context module. For instance, applications in a "Gardening" context module may be expected to access location related Schema_IDs for weather forecasts and climate information, whereas applications in a "Gambling" context module might access Schema_IDs for online gambling credentials. It may not be consistent with user privacy to provide location in gambling context, and online gambling credentials are not likely to be used in a gardening context.

In some embodiments, individual context applications may request that an association be made between, on the one hand, the context identifier of the context in which they are installed and, on the other hand, the particular schema identifiers. When the user requests installation of an application to the context module, the application requests from the firewall arrangement the Schema_IDs it will use. If the Schema_ID is not yet allowed in the firewall rules for the particular context module, the user can be prompted as to whether to accept a firewall rule that associates the requested schema identifier with the context identifier.

In some embodiments, a user is provided with the ability to review the associations between context identifiers and schema identifiers and to make adjustments through a user interface. In this way, a user is given control over the different data schema that can be accessed from within different context modules. The user interface may take into consideration hierarchical or other ontological structure of schema identifiers. For example, there may be a schema identifier "petname_dog" and a schema identifier "petname_cat" that are both instances of a schema identifier "petname." Thus, if a user deselects access to "petname," then access to both "petname_dog" and "petname_cat" is denied to the relevant context module.

In some embodiments, the rules data storage provides an association between schema identifiers and privacy tags. A privacy tag indicates particular privacy requirements for the schema. For example, a privacy tag may indicate that the particular piece of information can be used within a context module but is not to be distributed to upper levels or outside the user's client computing device. This kind of information might be for instance a phone book entry, needed by a phonebook context application having telephone numbers related to the particular context.

In some embodiments, the data elements identified by schema identifiers and/or the rules data may be digitally signed, or other techniques may be employed to preserve the integrity of the data.

Each schema identifier may be associated with a human-readable description explaining the content of the data element identified by the schema identifier. The human-readable description may be stored in the rules data storage or elsewhere, such as in a publicly-accessible database. In embodiments in which the rules data can be edited through a user interface, the descriptions may be accessible through the user interface, for example through a "help" button or a tooltip message.

Different context applications may be assigned different application identifiers (Application_ID). In an exemplary embodiment, when user installs a context application into a context module that has been installed on a client computing device, the client computing device fetches a set of schema identifiers associated with the application identifier, each schema identifier representing a data element to which the context application is requesting access. Going through the set of schema identifiers, the client computing device determines whether each schema identifier is available for use by the context module in which the context application was installed. That is, the device determines whether the context identifier of the context module is associated in the rules data storage with the schema identifier of the relevant data element. If the schema identifier is already associated with the context identifier, then the client computing device goes on to check the next schema identifier.

If, on the other hand, the schema identifier is not already associated with the context module, the user is prompted to provide input as to whether to make the data element identified by the schema identifier available to the context module. The user is given the option to request more information regarding the type of data stored in the data element, and this additional information is displayed on request by the user. If the user agrees to permit access to the data element identified by the schema identifier, then the schema identifier is associated with the context module in the rules data storage.

If the user does not agree to permit access to the data element identified by the schema identifier, then the schema identifier is not associated with the context module in the rules data storage. In some embodiments, the rules data storage may store information indicating that the user has specifically denied the context module access to the data element identified by the schema identifier. In such embodiments, the user may not be prompted to accept access to the data element by the context module when other context applications are installed in the context module and request access to that data element. In other embodiments, the user may still be prompted as to whether to permit access by the context module to the data element, but the prompt may include a reminder to the user that the user had previously declined to provide access to the data element.

In some embodiments, a user interface is provided that demonstrates the association between applications and context modules. When an application is launched using a user interface that identifies a particular context, that instance of the application is run with the data access permissions (e.g. firewall rules) associated with that context module.

Figure 2:
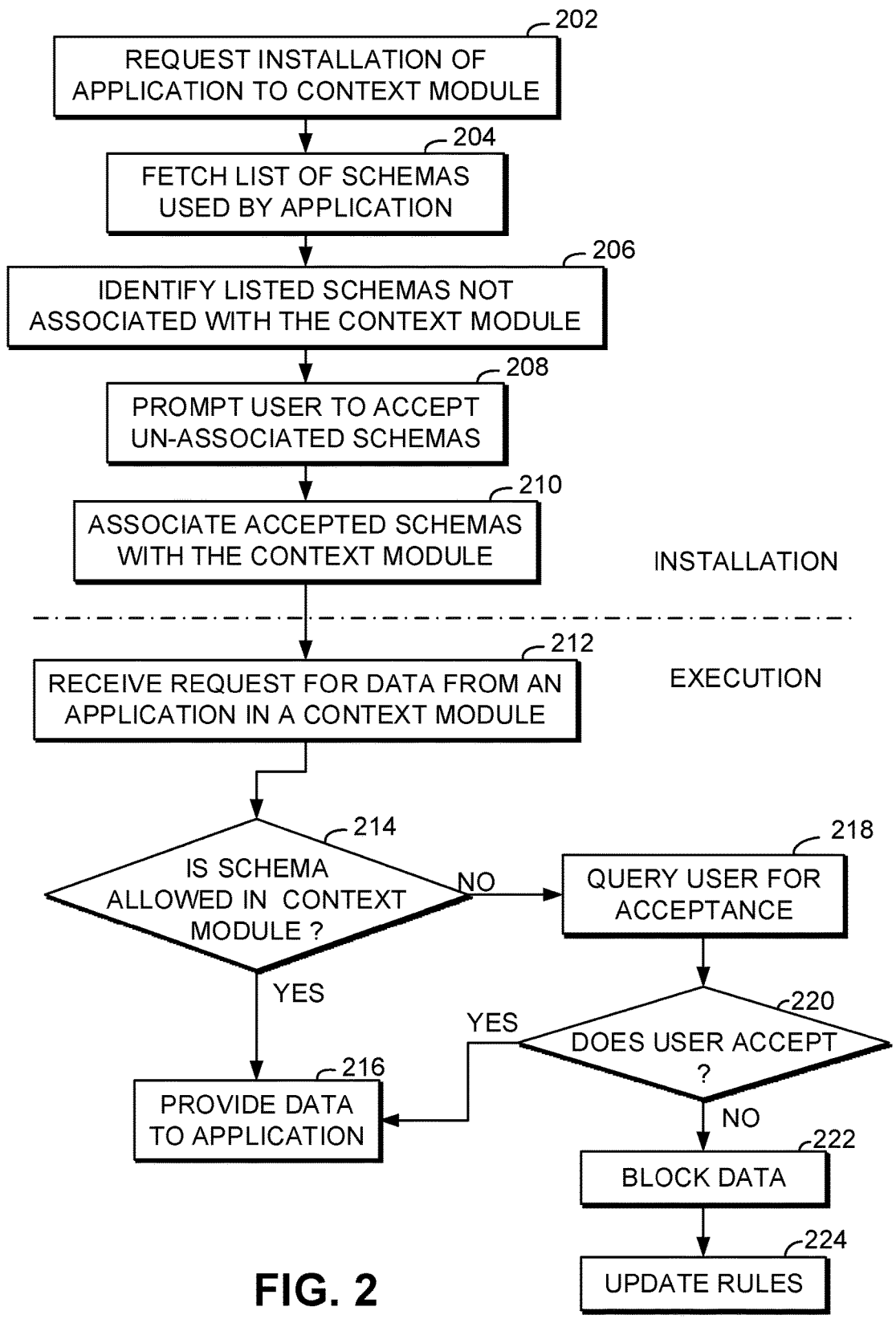
FIG. 2 is a flow chart illustrating a method of associating schema identifiers with context identifiers and enforcing firewall rules in some embodiments.

An exemplary method employing firewall rules is illustrated in FIG. 2. In step 202, a user requests that an application be installed to a particular context module at a user device. In step 204, in response to the request, a list of data schemas of which the application is requesting use is retrieved by the user device. The list of schemas may be available for download from an application marketplace or may be available from other network sources. The user device steps through the listed schemas and determines, for each schema, whether that schema is already associated with the selected context module as an allowed schema. In step 206, the user device identifies one or more requested schemas that are not already associated with the selected context module as allowed data schemas. In step 208, the user device prompts the user for input as to whether to accept the un-associated data schemas. In step 210, the user device associates the accepted schemas with the selected context module in the rules data storage. It should be noted that steps 206-210 (among others) may be performed in an interleaved or in a batched manner. For example, in an interleaved technique, a user is prompted (step 208) whenever an un-associated schema is identified (step 206), and steps 206 and 208 are repeated for each identified un-associated schema. In an exemplary batched technique, the user device may first identify all un-associated schemas in step 206 before prompting regarding all those un-associated schemas in step 208.

In some embodiments, the user must accept all requested schemas for installation to complete successfully. In such embodiments, installation is canceled when a user rejects a requested data schema. In other embodiments, installation may be completed even when the user does not accept all requested schemas. In the case that installation is completed without user acceptance of all requested schemas, any functionality of the installed application that is dependent on one or more of the rejected data schemas may be disabled or limited as appropriate.

After an application has been installed, the filter layer module or other component of the user device enforces the firewall rules. As illustrated in FIG. 2, in step 212, an application running in a context module requests data identified by a data schema. The filter layer module or other component determines in step 214 whether the requested data schema is allowed in the context module in which the application is running. If so, then in step 216, the filter layer module allows the requested data to be provided to the application.

If the filter layer module determines in step 214 that the requested data schema is not allowed in the context module, this may be indicative of one or more of various different scenarios. For example, the user may not have accepted all requested data schemas during installation of the application, the list of data schemas during installation may have been incomplete (either inadvertently or in an attempt to circumvent data protections), the application may have been updated to a new version that is requesting access to additional data schemas, or the user may have manually edited the data schemas allowed for use in the context module (see FIG. 10, below), among other possibilities. In some embodiments, as illustrated in step 218, the user may be prompted as to whether or not to accept access to the requested data. In other embodiments, access to the requested data may be blocked without prompting the user. The user may or may not be notified that a request for data access has been blocked. If it is determined in step 220 that the user does not accept access to the data, then access to the data is blocked in step 222. In some embodiments, the firewall rules are then updated in step 224 to reflect that the data schema at issue has been expressly rejected by the user for that context module. If, on the other hand, it is determined in step 220 that the user does accept access to the requested data schema, then the data identified by the requested data schema is provided to the application in step 216. In some embodiments, the firewall rules may be updated to reflect user allowance of the relevant data schema.

In some embodiments, the firewall rules include rules that prevent unauthorized sharing of personal data with outside entities and organizations. In such embodiments, the rules data storage includes information that associates schema identifiers with both context identifiers and entity identifiers. Such identifiers may be stored in the rules data storage as ID triplets, that is, a triplet of module identifier, schema identifier, and entity identifier. As an alternative to triplets, rules data storage can use other techniques to provide associations among module identifiers, schema identifiers, and entity identifiers, such as with the use of data structures that include pointers or other links.

In some embodiments, the agent layer module (illustrated in FIG. 1) operates to limit the release of personal information to outside organizations and entities. For example, a user may be interacting with a web site or other network service through an application installed in a context module. In the course of the interaction, the outside entity may request a particular type of information, such as login credentials. The agent layer module determines the schema identifier of the requested data elements, the module identifier of the relevant context module, and the entity identifier of the requesting entity. Once the agent layer module identifies this triplet of information, it determines whether the firewall rules permit transmission of the identified data element to the outside entity from the relevant context module.

The determination of whether the firewall rules permit transmission of the identified data element to the outside entity from the relevant context module may include a determination of whether the triplet of identifiers is stored in the rules data storage, or whether the three identifiers are otherwise associated with one another in the rules data storage. If so, the context module is permitted to send the data element to the outside entity.

If the identifiers of the data element, the context module, and the outside entity are not associated with one another in the rules data storage, then the user may be queried as to whether such an association should made in the rules data storage. Once a user has accepted a triplet, indicating that the particular data type from the particular module can be distributed to a particular entity the triplet is stored in rules data storage, and the user need not be prompted each time that data element is to be sent by that context module to that entity; subsequent data distribution characterized by that triplet is allowed.

If the user has rejected a triplet, instructing that the particular data type from the particular module should not be distributed to a particular entity, the agent layer module stores the rejection to memory and does not prompt the user again with similar triplet. Subsequent data distribution with that triplet is rejected.

It should be noted that the filter layer module and the agent layer module of FIG. 1 may use the same rules data storage or different data storage. For example, the associations between context identifiers and schema identifiers, and the associations among context identifiers, schema identifiers, and organizations, can be stored in the same database or other data structure or in different databases or data structures.

In some embodiments, when prompting for user acceptance regarding for approval of a triplet, the agent layer module checks if another triplet has previously been approved that includes a combination of two out of the three identifiers in question. If so, the agent layer module may remind the user of the previous approval. In some embodiments, where the user has previously rejected a similar triplet (e.g., a triplet having two of the three identifiers in common), the agent layer module may reject the distribution of data to the identified entity without prompting the user.

When the user is prompted for acceptance of a triplet of identifiers, the user may be presented with information describing the data element, the context module, or the organization in greater detail.

In some embodiments, the identifiers are associated with a description of the author and they are signed with digital signature, verifying the author. In such embodiments, whenever the filter layer module prompts the user, at least one of the authors of the identifier descriptions may be displayed.

Figure 3:
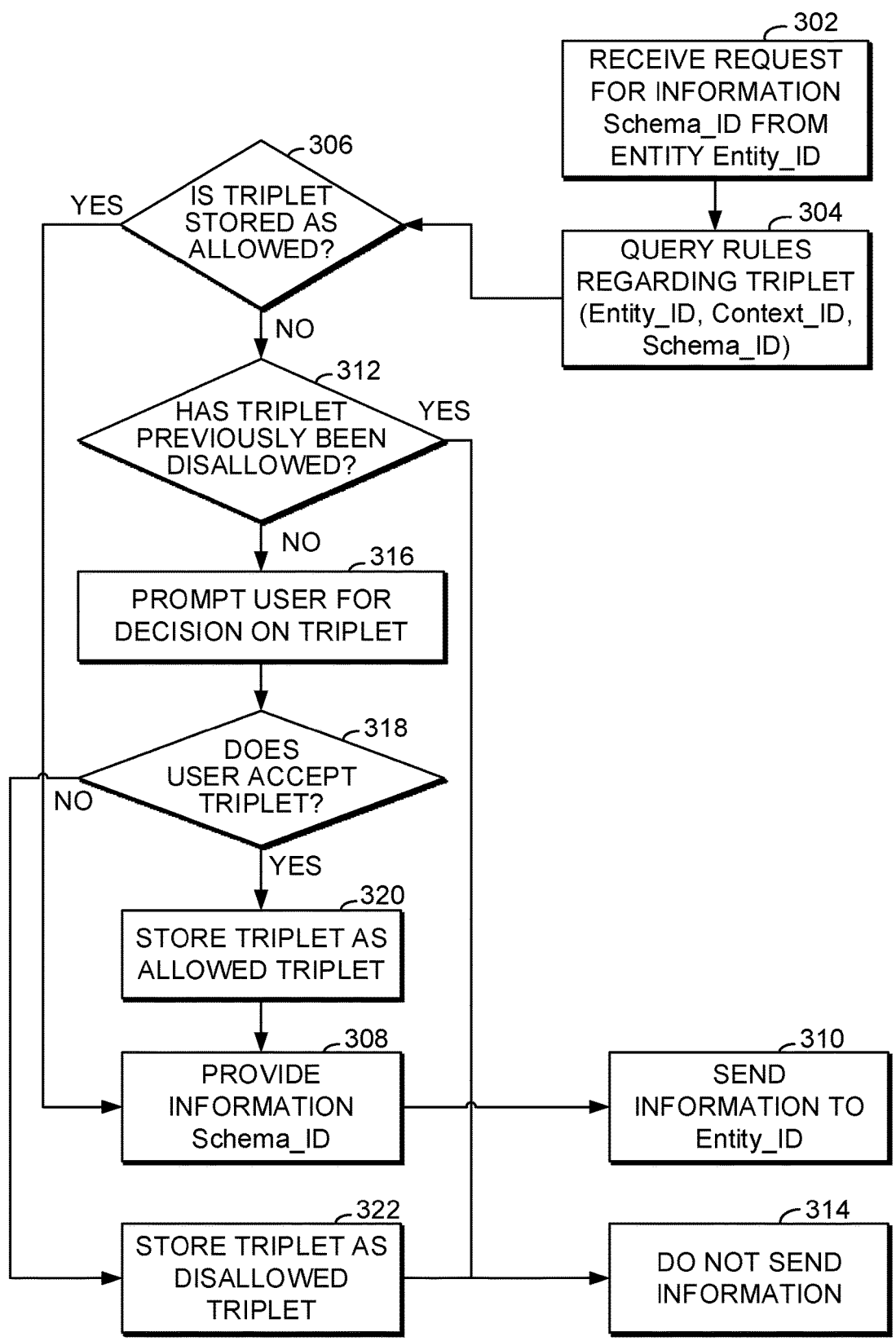
FIG. 3 is a flow chart illustrating a method of personal data protection implemented in some embodiments.

An exemplary data privacy method is illustrated in the flow diagram of FIG. 3. A request for personal data is made by an entity identified by an entity identifier Entity_ID. The requested data is identified by a schema identifier Schema_ID. In step in step 302, the request is received by an application running in a context module Context_ID on a user device. In step 304, the application queries the agent layer module (or other appropriate component) to determine whether the application should provide the requested data Schema_ID to the entity identified by Entity_ID. In step 306, the agent layer module determines whether the triplet of entity identifier Entity_ID, schema identifier Schema_ID, and context module identifier Context_ID are stored as an allowed triplet. If the triplet is stored as an allowed triplet, then in step 308, the requested data Schema_ID is provided to the application (or, if the application already has the requested data, the application receives approval to send the data to the entity Entity_ID). In step 310, the application sends the requested data to Entity_ID.

If it is determined in step 306 that the triplet has not been stored as an allowed triplet, then the agent layer module determines in step 312 whether that triplet has explicitly been disallowed. If the triplet has previously been disallowed, then the requested information is not sent to the requesting entity (step 314). In step 314, the application may simply fail to respond to the request for information, or the application may explicitly report to the requesting entity that the information will not be provided.

If the triplet has not previously been stored as an explicitly allowed or explicitly disallowed triplet, then in step 316, the agent layer module prompts the user for a decision on whether the triplet should be allowed or disallowed. The user may be allowed to select responses such as "Always Allow," "Allow Once," "Block for Now," or "Block Always." These responses may me specific to each entity. Different actions are taken based on different responses. If the user accepts the triplet (e.g. by clicking on or touching an "Always Allow" button), then in step 320, the triplet is stored as an allowed triplet. If the user rejects the triplet (e.g. by clicking on or touching a "Block Always" button), the triplet is stored as a disallowed triplet. Appropriate actions may also be taken in response to selection of "Allow Once" or "Block for Now" options.

In some embodiments, the prompt that is shown to the user in step 316 is adapted based on whether the user is predicted to accept or to reject the triplet. For example, if the user has previously accepted a triplet that includes two out of three of the relevant identifiers, the user device may prompt the user to accept the newly-proposed triplet. If the user has previously rejected a triplet including two out of three of the relevant identifiers, the user device may prompt the user to reject the triplet. Either way, the ultimate choice lies with the user.

Figure 4:
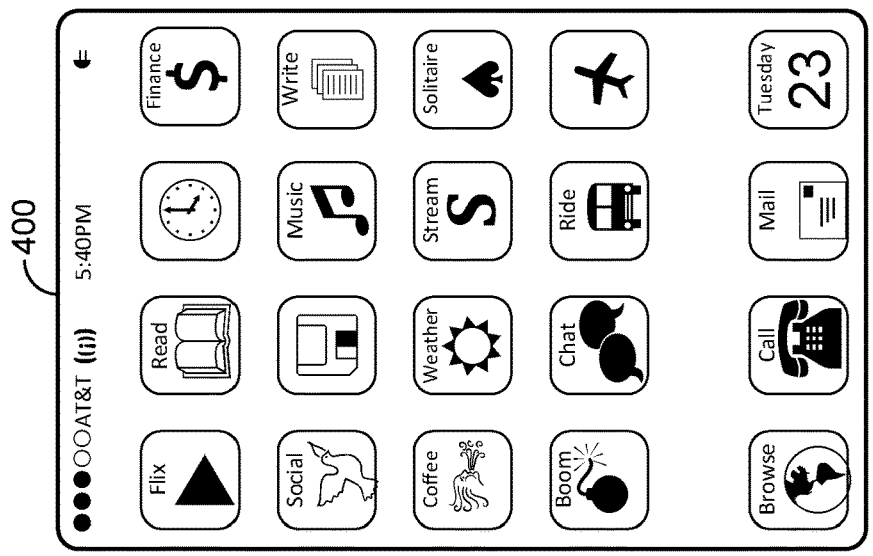
FIG. 4 is an illustration of the appearance of an exemplary user interface.

An exemplary user interface that does not provide for selection of different contexts is illustrated in FIG. 4. From the user interface 400 of FIG. 4, it is not clear what data permissions apply to each application.

Figure 5:
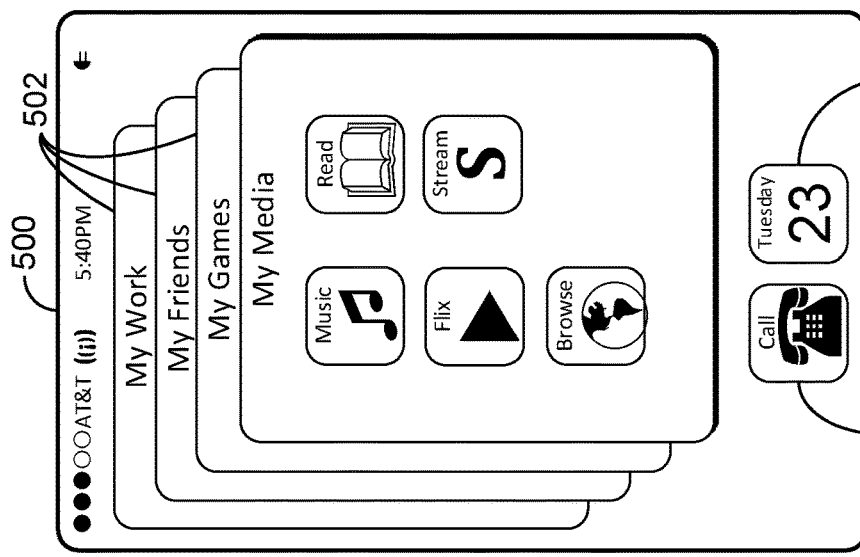
FIG. 5 is an illustration of the appearance of an exemplary user interface for a user computing device having a plurality of context modules.

FIG. 5 illustrates a user interface 500 that supports the display of context modules as different containers of application icons. In the interface of FIG. 5, different context modules are associated with different cards 502 in a 3D-card type of interface. Users can select cards by, for example, swiping left or right on a touch screen interface to bring different context modules to the foreground. In the example of FIG. 5, the My Media context module is in the foreground. When a user selects the icon of an application in the My Media context module (such as the exemplary media applications Music, Read, Flix, or Stream), an instance of the selected application is opened and executed using the data permissions (such as firewall rules) associated with the My Media context module.

Figure 6:
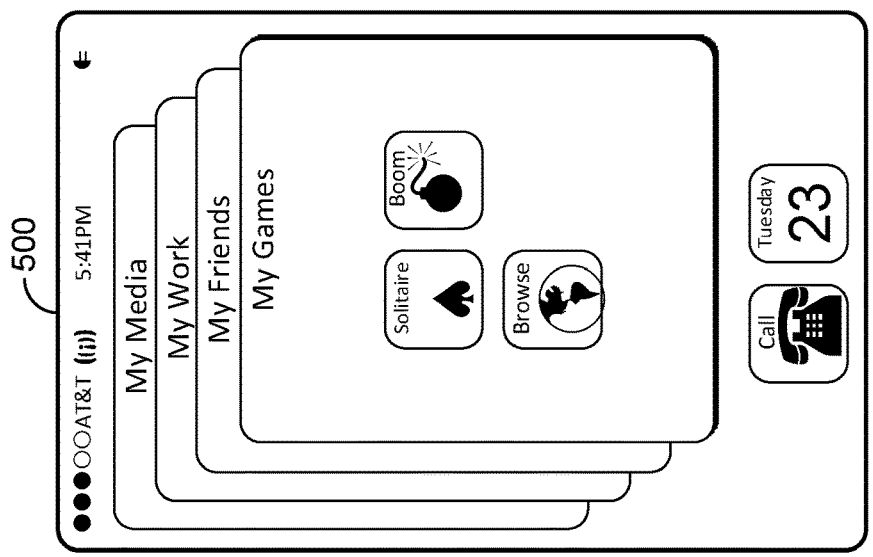
FIG. 6 is another illustration of the appearance of an exemplary user interface for a user computing device having a plurality of context modules.

FIG. 6 illustrates user interface 500 after the user has swiped or otherwise provided input that brings the My Games context module to the foreground. From the My Games context module, the user can select a context application such as the exemplary games Solitaire or Boom. This selection causes an instance of the selected application to be opened and executed using the data permissions associated with the My Games context module.

It may be noted that a web browser application Browse is available in both the My Media and My Games context modules. By selecting the context module from which the browser application is launched, the user implicitly determines the data permissions of that instance of the browser. For example, different instances of the browser launched from different context modules may have read/write access to different browsing history files, different sets of bookmarks, different sets of HTTP cookies, different home pages, and the like.

Figure 8:
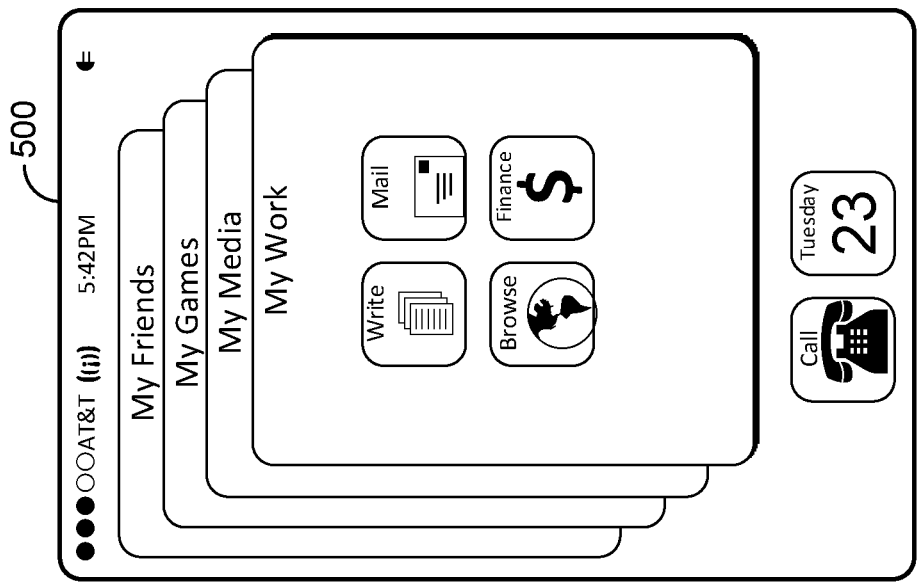
FIG. 8 is a further illustration of the appearance of an exemplary user interface for a user computing device having a plurality of context modules.
Figure 7:
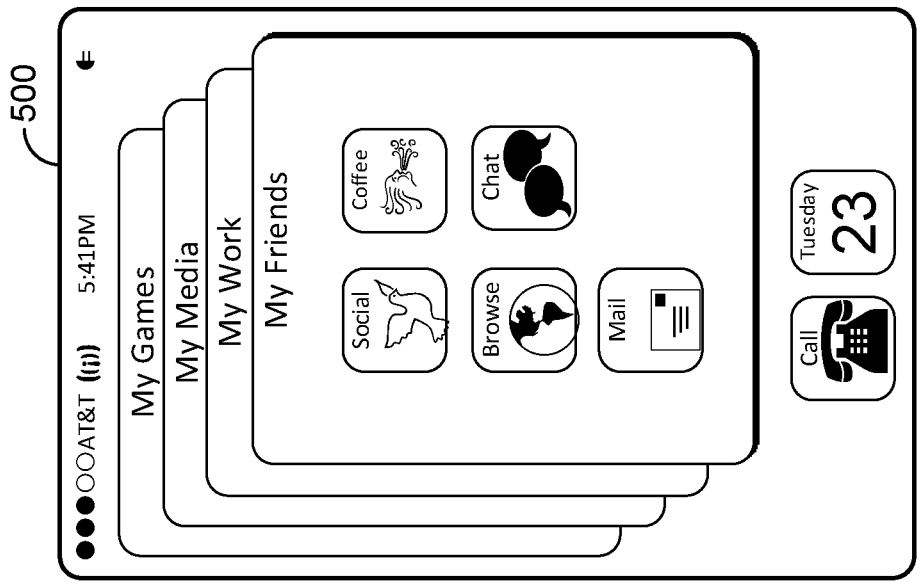
FIG. 7 is a further illustration of the appearance of an exemplary user interface for a user computing device having a plurality of context modules.

As illustrated in FIGS. 7 and 8, further input (e.g. swiping) by the user selects, respectively, the My Friends context and the My Work context. Notably, the email application "Mail" is available from both the My Friends and My Work context. By selecting the context module from which the email application is launched, the user implicitly determines the data permissions of that instance of the email application. Different instances of the email application launched from different context modules may have read/write access to different collections of files that can be attached to emails. For example, personal photos may be inaccessible to the email application when the application is launched from the My Work context, while work-related files may be inaccessible to instances of the email application that were launched from the My Friends context module. Different context modules may be associated with different user email addresses, different mail servers, different address books (contact lists), different encryption settings, and the like.

In some embodiments, user devices support legacy applications or other applications for which data permissions may be set individually. For example, in the interface of FIGS. 5-8, a telephone application (icon 504) and a calendar application (icon 506) are accessible outside of any context module. In some embodiments, the data permissions for applications outside of any context module are set independently from any context module. In other embodiments, there may be a particular context module for frequently-used "docked" applications.

Figure 10:
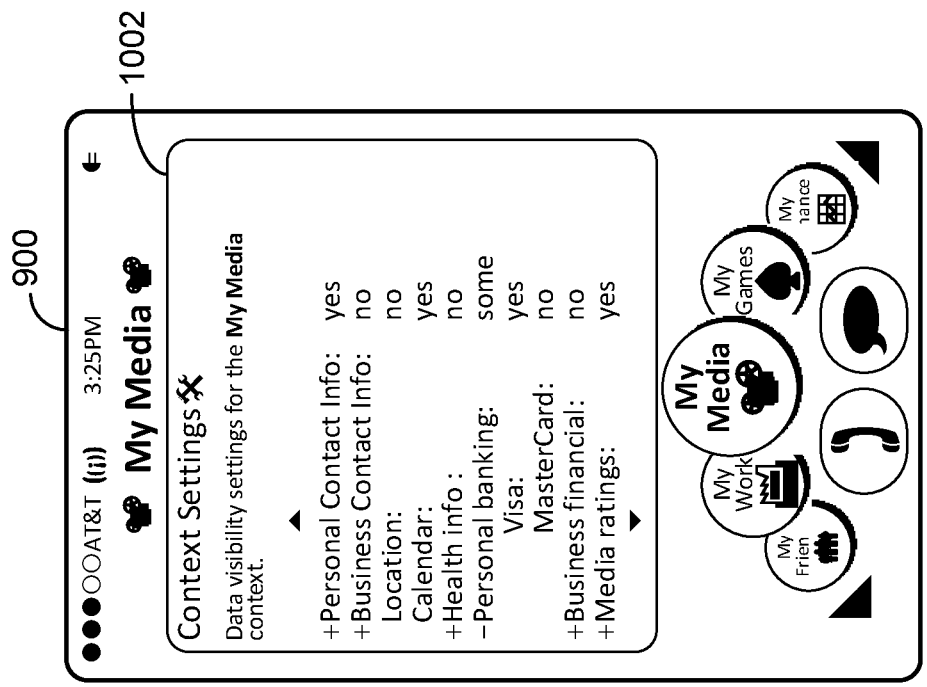
FIG. 10 is an illustration of the appearance of context settings menu on a user interface of a user computing device having a plurality of context modules.
Figure 9:
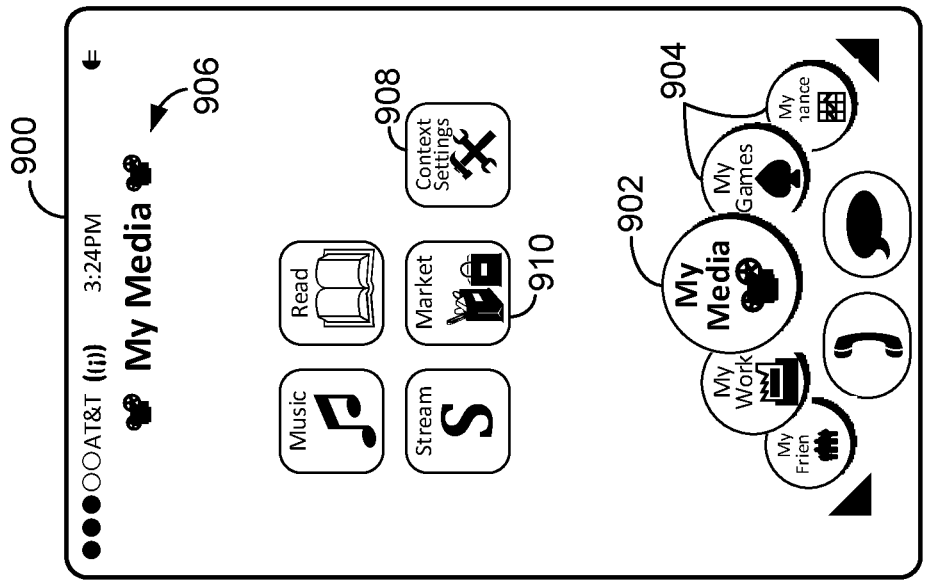
FIG. 9 is an illustration of the appearance of an alternative exemplary user interface for a user computing device having a plurality of context modules.

FIGS. 9 and 10 illustrate an alternative user interface used in some embodiments. In the interface 900 of FIGS. 9 and 10, a user has the ability to select a context by swiping left or right or otherwise scrolling substantially horizontally through a menu of context tokens with labels such as My Friends, My Work, My Media, My Games, My Finance, and possibly other contexts. A token 902 corresponding to the currently-selected context (My Media) is displayed in a larger size and in the foreground (compared to background tokens 904), though other techniques may also be used to indicate which context is selected. In some embodiments, the menu of context tokens is normally invisible until the user takes an action, such as swiping upward from the bottom of the touch screen, to make the menu visible. In the illustrated embodiment, a banner 906 indicating "My Media" is displayed at the top of the screen to identify for the user the currently-selected context module. In this example, the application icons included in the My Media container screen include exemplary media applications Music, Read, Stream, Flix, and the browser application Browse. The user is further offered an option to elect an icon 908 for "Context Settings." FIG. 10 illustrates an exemplary outcome of the user clicking the Context Settings icon 908.

As illustrated in FIG. 10, the user is provided with a menu 1002 of data permissions that applies to the My Media context. The user is provided with the opportunity to select whether particular types of data are accessible to applications launched from within the My Media context module. In some embodiments, as illustrated in FIG. 10, data types are arranged in a hierarchical fashion, allowing the user to make fine-grained or coarse-grained determinations as to data availability. For example, the topic "Health info" has a plus sign, indicating that the user can open the topic to make more fine-grained decisions. However, the user in the example has determined that this is not necessary, and that no health information should be accessible to any application in the My Media context. On the other hand, the user has opened the "Personal banking" topic to make more fine-grained selections. For example, the user has determined that his Visa information should be accessible (e.g. for pay-per-view or subscription purposes), but the MasterCard information should not be available.

Figure 11:
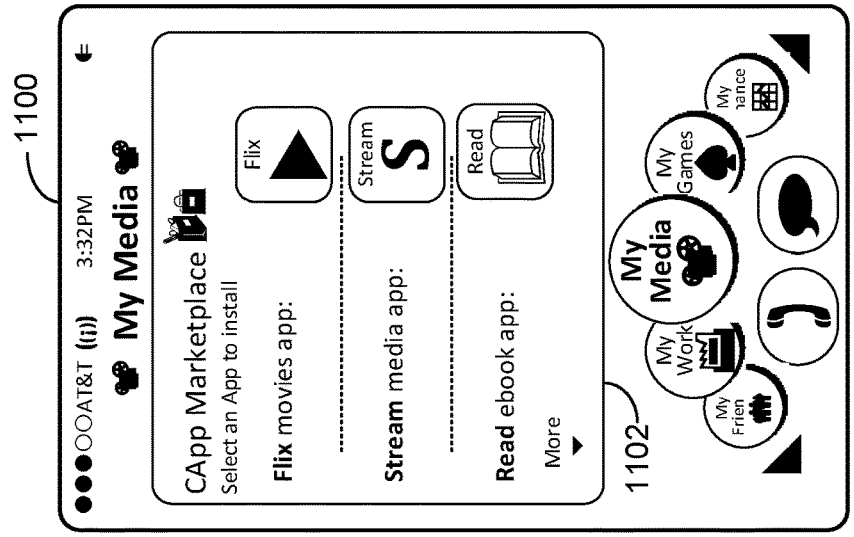
FIG. 11 is an illustration of the appearance of a user interface through which a user is able to access an application marketplace and to request installation of a selected context application.

A user interface that may be displayed during performance of the method of FIG. 2 is illustrated in FIG. 11. FIG. 11 illustrates an exemplary interface 1100 for user interaction with a context application marketplace (e.g., marketplace 110 of FIG. 1). The user interface allows a user to access the marketplace and to select through a menu 1102 which context applications are downloaded and installed in a selected context module. In this illustration, the selected context module is the My Media context module. This interface may be reached by, for example, selecting the icon labeled "Market" (icon 910) illustrated in the interface of FIG. 9.

Figure 12:
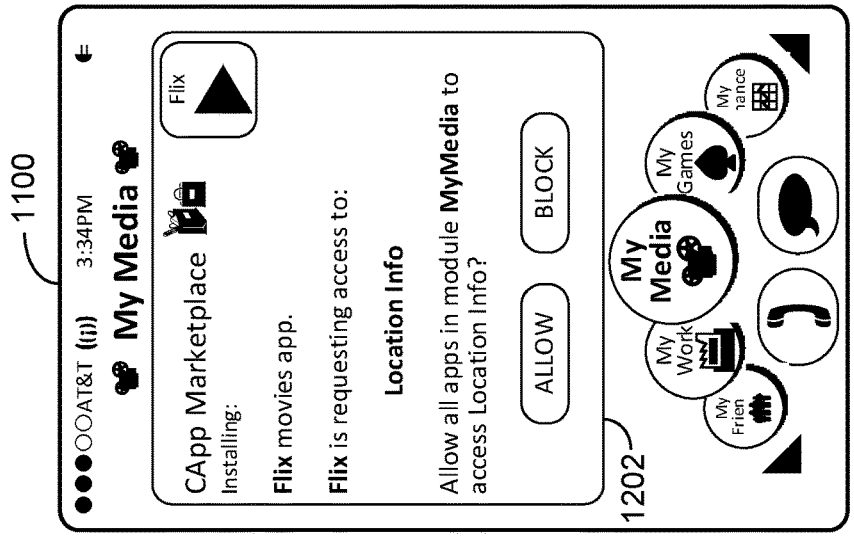
FIG. 12 is an illustration of the appearance of a user interface on which a user has been prompted as to whether to accept an exemplary firewall rule.

In the example of FIG. 11, the menu interface 1102 for "CApp Marketplace" allows a user to select and install context applications such as a "Flix" movies application, a "Stream" media application, and a "Read" e-book application. In this example, the user selects the Flix application for installation. As described in greater detail above, the user's device obtains a list of data schema relating to data to which the Flix application may request access. In this example, the list indicates that the Flix application requests use of, among other data, data identified by the data schema Location Info. Because, in this example, the user has not previously given the context module My Media access to Location Info, the user is prompted by a prompt 1202, as illustrated in FIG. 12, to select whether or not to allow the context module My Media to have access to Location Info. The prompt may alert the user that this selection will affect all applications installed in the My Media context module (e.g. "Allow all apps in module MyMedia to access Location Info?"). Firewall rules are updated in response to the user selection.

Figure 13:
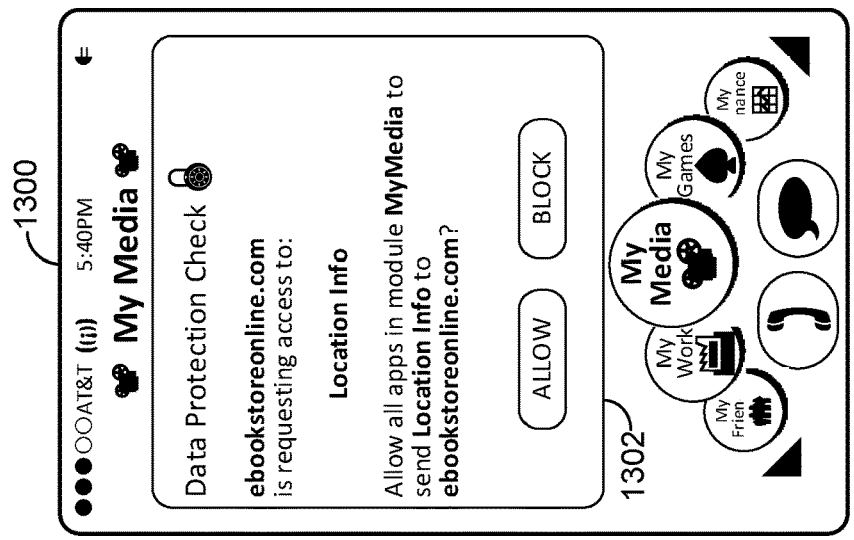
FIG. 13 is an illustration of the appearance of a user interface on which a user has been prompted as to whether to accept a proposed communication to an external entity.

An exemplary user interface 1300 that may appear during implementation of the method of FIG. 3 is illustrated in FIG. 13. In the illustration, a user is using an application in the context module MyMedia to interact with an external entity with the entity identifier "ebookstoreonline.com". In the course of the interaction, the external entity requests information identified with the data schema "Location Info." The filter layer module or other appropriate component of the user device determines whether the triplet "ebookstoreonline.com", "MyMedia", "Location Info" is already stored as an allowed triplet. In the example of FIG. 13, the triplet has not yet been stored as an allowed triplet. As a result, the user device prompts the user with a prompt 1302 giving the user the option to either allow or block the triplet. If the user allows the triplet, then the triplet {ebookstoreonline.com, MyMedia, Location Info} is stored as an allowed triplet. In such a case, the requested Location Info is shared with the entity ebookstoreonline.com, and future requests from ebookstoreonline.com for Location Info through the MyMedia context module will be satisfied without requiring user prompting. On the other hand, if the user blocks the triplet, then the triplet is stored as a disallowed triplet. In such a case, the requested Location Info is not provided to the entity ebookstoreonline.com, and future requests from ebookstoreonline.com for Location Info through the MyMedia context module will be rejected without requiring user prompting. As discussed in greater detail with respect to FIG. 3, other user options may be provided (e.g. "block once" or "allow once"), and the user prompt may include information indicating whether the user has previously allowed or rejected a similar triplet (e.g. a triplet having two of the same elements).

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Exemplary embodiments disclosed herein are implemented using one or more wired and/or wireless network nodes, such as a wireless transmit/receive unit (WTRU) or other network entity.

Figure 14:
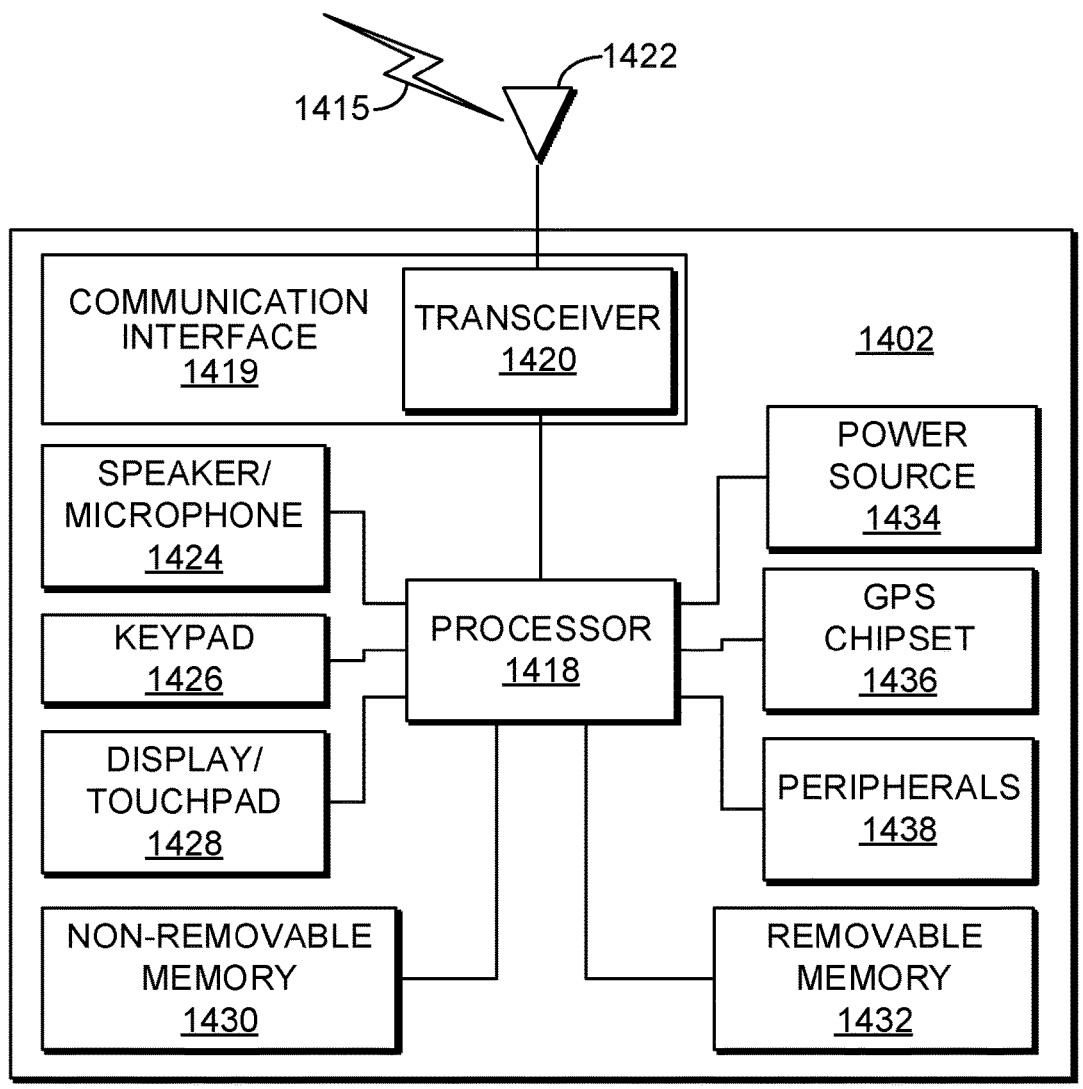
FIG. 14 is a functional block diagram of a wireless transmit-receive unit (WTRU) employed as a user computing device in some embodiments.

FIG. 14 is a system diagram of an exemplary WTRU 1402, which may be employed as a user device in embodiments described herein. As shown in FIG. 14, the WTRU 1402 may include a processor 1418, a communication interface 1419 including a transceiver 1420, a transmit/receive element 1422, a speaker/microphone 1424, a keypad 1426, a display/touchpad 1428, a non-removable memory 1430, a removable memory 1432, a power source 1434, a global positioning system (GPS) chipset 1436, and sensors 1438. It will be appreciated that the WTRU 1402 may include any sub-combination of the foregoing elements while remaining consistent with an embodiment.

The processor 1418 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1418 may perform signal coding, data processing, power control, input/output processing, and/or any other functionality that enables the WTRU 1402 to operate in a wireless environment. The processor 1418 may be coupled to the transceiver 1420, which may be coupled to the transmit/receive element 1422. While FIG. 14 depicts the processor 1418 and the transceiver 1420 as separate components, it will be appreciated that the processor 1418 and the transceiver 1420 may be integrated together in an electronic package or chip.

The transmit/receive element 1422 may be configured to transmit signals to, or receive signals from, a base station over the air interface 1415. For example, in one embodiment, the transmit/receive element 1422 may be an antenna configured to transmit and/or receive RF signals. In another embodiment, the transmit/receive element 1422 may be an emitter/detector configured to transmit and/or receive IR, UV, or visible light signals, as examples. In yet another embodiment, the transmit/receive element 1422 may be configured to transmit and receive both RF and light signals. It will be appreciated that the transmit/receive element 1422 may be configured to transmit and/or receive any combination of wireless signals.

In addition, although the transmit/receive element 1422 is depicted in FIG. 14 as a single element, the WTRU 1402 may include any number of transmit/receive elements 1422. More specifically, the WTRU 1402 may employ MIMO technology. Thus, in one embodiment, the WTRU 1402 may include two or more transmit/receive elements 1422 (e.g., multiple antennas) for transmitting and receiving wireless signals over the air interface 1415.

The transceiver 1420 may be configured to modulate the signals that are to be transmitted by the transmit/receive element 1422 and to demodulate the signals that are received by the transmit/receive element 1422. As noted above, the WTRU 1402 may have multi-mode capabilities. Thus, the transceiver 1420 may include multiple transceivers for enabling the WTRU 1402 to communicate via multiple RATs, such as UTRA and IEEE 802.11, as examples.

The processor 1418 of the WTRU 1402 may be coupled to, and may receive user input data from, the speaker/microphone 1424, the keypad 1426, and/or the display/touchpad 1428 (e.g., a liquid crystal display (LCD) display unit or organic light-emitting diode (OLED) display unit). The processor 1418 may also output user data to the speaker/microphone 1424, the keypad 1426, and/or the display/touchpad 1428. In addition, the processor 1418 may access information from, and store data in, any type of suitable memory, such as the non-removable memory 1430 and/or the removable memory 1432. The non-removable memory 1430 may include random-access memory (RAM), read-only memory (ROM), a hard disk, or any other type of memory storage device. The removable memory 1432 may include a subscriber identity module (SIM) card, a memory stick, a secure digital (SD) memory card, and the like. In other embodiments, the processor 1418 may access information from, and store data in, memory that is not physically located on the WTRU 1402, such as on a server or a home computer (not shown).

The processor 1418 may receive power from the power source 1434, and may be configured to distribute and/or control the power to the other components in the WTRU 1402. The power source 1434 may be any suitable device for powering the WTRU 1402. As examples, the power source 1434 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 1418 may also be coupled to the GPS chipset 1436, which may be configured to provide location information (e.g., longitude and latitude) regarding the current location of the WTRU 1402. In addition to, or in lieu of, the information from the GPS chipset 1436, the WTRU 1402 may receive location information over the air interface 1415 from a base station and/or determine its location based on the timing of the signals being received from two or more nearby base stations. It will be appreciated that the WTRU 1402 may acquire location information by way of any suitable location-determination method while remaining consistent with an embodiment.

The processor 1418 may further be coupled to other peripherals 1438, which may include one or more software and/or hardware modules that provide additional features, functionality and/or wired or wireless connectivity. For example, the peripherals 1438 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

It should be noted that words such as "first," "second," and the like are used herein as modifiers only to distinguish among different components. Such modifiers are not intended to impose any ordinal limitations on their respective objects. The term "set" as used herein refers to set of one or more elements. Use of the plural form with reference to the elements of a set (e.g. "a set of elements") is a matter of grammatical convention and is not intended require the existence of more than one element.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for context-sensitive control over distribution of personal or sensitive information, comprising:
   implementing a filtering layer module that acts as a local firewall to prevent unauthorized access by applications to data elements within a computing environment;
   identifying one or more pieces of data stored in a common repository as one or more data schemas each having a unique schema identifier;
   identifying one or more context modules in the computing environment, wherein each context module having a unique context identifier;

creating local firewall rules by associating one or more context identifiers with one or more schema identifiers, which associates context modules represented by the one or more context identifiers in the local firewall rule to the one or more data schemas represented by the one or more schema identifiers;

executing one or more applications within a context module, when the one or more applications are allowed to access only the one or more data schemas which are associated with the context module according to the local firewall rule;

receiving a request for installation of an application in a context module of a computing device;

identifying a plurality of requested data schemas associated with the application;

from among the plurality of requested data schemas, identifying a set of data schemas that are not associated with the context module in the local firewall rule and hence identified as not allowed set of data schemas for the context;

prompting a user for acceptance of the identified not allowed set of data schemas in the context module; and storing the identified not allowed set of data schemas that have been accepted by the user by associating them with the context module in the local firewall rule as allowed data schemas.

2. The method of claim 1, wherein storing the accepted data schemas as allowed data schemas includes associating schema identifiers of the allowed data schemas with an identifier of the context module in a rules data storage.

3. The method of claim 2, wherein the computing device includes a plurality of context modules, and wherein the rules data storage associates identifiers of each of the context modules with respective data schema identifiers.

4. The method of claim 1, further comprising completing installation of the application only after user acceptance of all the identified not allowed set of data schemas.

5. The method of claim 1, further comprising, in response to user rejection of at least one of the identified not allowed set of the data schemas, canceling installation of the application.

6. The method of claim 1, further comprising:
opening the application in the context module;
receiving from the application a request for data having a requested data schema;
determining whether the requested data schema is an allowed data schema associated with the context module; and
providing data associated with the requested data schema to the application only after determining that the requested data schema is an allowed data schema associated with the context module.

7. The method of claim 6, wherein determining whether the requested data schema is an allowed data schema includes determining whether an identifier of the requested data schema is associated with an identifier of the context module in a rules data storage.

8. The method of claim 7, wherein the computing device includes a plurality of context modules, and wherein the rules data storage associates identifiers of each of the context modules with respective data schema identifiers.

9. The method of claim 1, wherein the context module is a virtual platform.

10. The method of claim 1, wherein identifying a plurality of requested data schemas associated with the application includes consulting an online database of data schemas.

11. The method of claim 1, wherein receiving a request for user installation of an application includes receiving input indicating that the user has selected the application in an application marketplace.

12. A user computing device for context-sensitive control over distribution of personal or sensitive information including a processor and non-transitory storage medium storing instructions operative, when executed on the processor, to perform functions including:
implementing a filtering layer module that acts as a local firewall to prevent unauthorized access by applications to data elements within a computing environment;
identifying one or more pieces of data stored in a common repository as one or more data schemas each having a unique schema identifier;
identifying one or more context modules in the computing environment, wherein each context module having a unique context identifier;
creating local firewall rules by associating one or more context identifiers with one or more schema identifiers, which associates context modules represented by the one or more context identifiers in the firewall rule to the one or more data schemas represented by the one or more schema identifiers;
executing one or more applications within a context module, when the one or more applications are allowed to access only the one or more data schemas which are associated with the context module according to the local firewall rule;
receiving a request for installation of an application in a context module of the computing device;
identifying a plurality of requested data schemas associated with the application;
from among the plurality of requested data schemas, identifying a set of data schemas that are not associated with the context module in the local firewall rule and hence identified as not allowed set of data schemas for the context;
prompting a user for acceptance of the not allowed set of data schemas in the context module; and
storing the identified not allowed set of data schemas that have been accepted by the user by associating them with the context module in the local firewall rule as allowed data schemas.

13. The user computing device of claim 12, wherein storing the accepted data schemas as allowed data schemas include associating schema identifiers associated of the allowed data schemas with an identifier of the context module in a rules data storage.

14. The user computing device of claim 12, wherein the instructions further include instructions operative to perform functions including:
opening the application in the context module;
receiving from the application a request for data having a requested data schema;
determining whether the requested data schema is an allowed data schema associated with the context module; and
providing data associated with the requested data schema to the application only after determining that the requested data schema is an allowed data schema associated with the context module.

15. The user computing device of claim 12, wherein the context module is a virtual platform.

* * * * *